(12) United States Patent
Kim et al.

(10) Patent No.: US 12,137,226 B2
(45) Date of Patent: *Nov. 5, 2024

(54) METHOD AND APPARATUS FOR DETERMINING REFERENCE PICTURE SET OF IMAGE

(71) Applicant: SAMSUNG ELECTRONICS CO., LTD., Suwon-si (KR)

(72) Inventors: Il-koo Kim, Osan-si (KR); Young-o Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,669

(22) Filed: Nov. 10, 2023

(65) Prior Publication Data

US 2024/0080449 A1 Mar. 7, 2024

Related U.S. Application Data

(63) Continuation of application No. 17/956,203, filed on Sep. 29, 2022, now Pat. No. 11,856,201, which is a
(Continued)

(51) Int. Cl.
*H04N 19/136* (2014.01)
*H04N 19/124* (2014.01)
(Continued)

(52) U.S. Cl.
CPC ......... *H04N 19/136* (2014.11); *H04N 19/124* (2014.11); *H04N 19/172* (2014.11);
(Continued)

(58) Field of Classification Search
CPC .. H04N 19/136; H04N 19/124; H04N 19/172; H04N 19/463; H04N 19/58; H04N 19/70
See application file for complete search history.

(56) References Cited

U.S. PATENT DOCUMENTS 6,459,812 B2 10/2002 Suzuki et al.
8,094,711 B2 1/2012 Tourapis et al.
(Continued)

FOREIGN PATENT DOCUMENTS

CN 1476251 A 2/2004
CN 1478355 A 2/2004
(Continued)

OTHER PUBLICATIONS

Communication dated Feb. 16, 2024, issued by the European Patent Office in European Application No. 20211570.5.
(Continued)

*Primary Examiner* — Kyle M Lotfi
(74) *Attorney, Agent, or Firm* — Sughrue Mion, PLLC

(57) ABSTRACT

A method of determining a reference picture set (RPS), which is a set of reference pictures used in predictive decoding of a current picture that is to be decoded includes: obtaining a flag indicating whether the RPS is determined based on POC values of the current picture and a previous picture or whether the RPS is determined based on an index of a reference RPS, which is an identification value of the reference RPS that is one of pre-defined RPSs and is referred to in determining the RPS, and a delta RPS that is a difference value between a POC vale of a reference picture included in the reference RPS and a POC value of a reference picture included in the RPS; and determining the RPS according to a value of the flag.

3 Claims, 13 Drawing Sheets

Related U.S. Application Data continuation of application No. 17/231,763, filed on Apr. 15, 2021, now Pat. No. 11,490,091, which is a continuation of application No. 16/799,362, filed on Feb. 24, 2020, now Pat. No. 11,006,120, which is a continuation of application No. 16/207,656, filed on Dec. 3, 2018, now Pat. No. 10,609,378, which is a continuation of application No. 14/394,820, filed as application No. PCT/KR2013/003181 on Apr. 16, 2013, now Pat. No. 10,171,811.

(60) Provisional application No. 61/624,468, filed on Apr. 16, 2012.

(51) Int. Cl.
  H04N 19/172     (2014.01)
  H04N 19/174     (2014.01)
  H04N 19/463     (2014.01)
  H04N 19/58      (2014.01)
  H04N 19/70      (2014.01)
  H04N 19/86      (2014.01)

(52) U.S. Cl.
  CPC ........... *H04N 19/463* (2014.11); *H04N 19/58* (2014.11); *H04N 19/70* (2014.11); *H04N 19/174* (2014.11); *H04N 19/86* (2014.11)

(56) References Cited

U.S. PATENT DOCUMENTS

| | | | |
|---|---|---|---|
| 8,855,200 | B2 | 10/2014 | Koo et al. |
| 2006/0133486 | A1 | 6/2006 | Boyce |
| 2007/0014357 | A1 | 1/2007 | Jeon |
| 2007/0019724 | A1 | 1/2007 | Tourapis et al. |
| 2007/0199011 | A1 | 8/2007 | Zhang et al. |
| 2008/0165860 | A1 | 7/2008 | Sahraoui et al. |
| 2009/0238261 | A1 | 9/2009 | Bhavani et al. |
| 2010/0034293 | A1 | 2/2010 | Lin et al. |
| 2010/0118944 | A1 | 5/2010 | Tanaka et al. |
| 2011/0080949 | A1 | 4/2011 | Takahashi et al. |
| 2011/0096843 | A1 | 4/2011 | Abe et al. |
| 2012/0008690 | A1 | 1/2012 | Lee et al. |
| 2012/0014442 | A1 | 1/2012 | Takahashi et al. |
| 2012/0076208 | A1 | 3/2012 | Winger |
| 2013/0188881 | A1 | 7/2013 | Zhao et al. |
| 2013/0188882 | A1 | 7/2013 | Zhao et al. |
| 2013/0208792 | A1 | 8/2013 | He et al. |
| 2013/0215975 | A1 | 8/2013 | Samuelsson et al. |
| 2013/0272403 | A1 | 10/2013 | Ramonian et al. |
| 2014/0105286 | A1 | 4/2014 | Caglar et al. |
| 2014/0105297 | A1 | 4/2014 | Jeon et al. |
| 2015/0103882 | A1 | 4/2015 | Kim et al. |
| 2017/0264893 | A1 | 9/2017 | Pandit et al. |

FOREIGN PATENT DOCUMENTS

| | | | |
|---|---|---|---|
| CN | 1846444 | A | 10/2006 |
| CN | 101455082 | A | 6/2009 |
| CN | 101496407 | A | 7/2009 |
| CN | 101676913 | A | 3/2010 |
| CN | 101119493 | B | 12/2010 |
| CN | 102025992 | A | 4/2011 |
| CN | 102340666 | A | 2/2012 |
| EP | 2117237 | A1 | 11/2009 |
| EP | 2135456 | B1 | 5/2017 |
| JP | 2012-34397 | A | 2/2012 |
| JP | 2015517273 | A | 6/2015 |
| KR | 10-2008-0034752 | A | 4/2008 |
| KR | 10-2009-0033848 | A | 4/2009 |
| KR | 10-2011-0037853 | A | 4/2011 |
| KR | 10-2012-0005934 | A | 1/2012 |
| RU | 2 342 803 | C2 | 9/2005 |
| RU | 2014 102 955 | A | 8/2015 |
| WO | 2012/005549 | A2 | 1/2012 |
| WO | 2013108641 | A1 | 7/2013 |

OTHER PUBLICATIONS

Communication dated Apr. 15, 2024, issued by the Intellectual Property Office of the Phillipines in Phillipine Application No. 1/2017/502288.
Communication dated Apr. 16, 2024, issued by the Intellectual Property Office of the Phillipines in Phillipine Application No. 1/2017/502287.
Communication dated Apr. 16, 2024, issued by the Intellectual Property Office of the Phillipines in Phillipine Application No. 1/2017/502289.
Communication dated Apr. 16, 2024, issued by the Intellectual Property Office of the Phillipines in Phillipine Application No. 1/2017/502290.
Benjamin Bross et al; High Efficiency Video Coding (HEVC) text sepcification draft 6; Joint Collaborative Team on Video Coding (JCT-VC) of ITU-T SG16 WP3 and ISO/IEC JTC1/SC29/WG11; 7th Meeting; Nov. 21-30, 2011; 266 pgs. total.
Communication dated Aug. 10, 2015 issued by the European Patent Office in counterpart European Patent Application No. 13778457.5.
Communication dated Dec. 24, 2018, issued by the Russian Patent Office in counterpart Russian Application No. 2018114251/07(022272).
Communication dated Dec. 8, 2015, issued by the Japanese Patent Office in counterpart Japanese Application No. 2015-506888.
Communication dated Feb. 15, 2018, issued by the Intellectual Property Office of the Philippines in counterpart Philippine application No. 1/2014/502315.
Communication dated Jun. 1, 2020, issued by the State Intellectual Property Office of P.R. China in counterpart Chinese Application No. 201810708748.5.
Communication dated Jun. 15, 2020, issued by the State Intellectual Property Office of P.R. China in counterpart Chinese Application No. 201810709026.1.
Communication dated Jun. 3, 2020, issued by the State Intellectual Property Office of P.R. China in counterpart Chinese Application No. 201810710485.1.
Communication dated Mar. 14, 2016 issued by Russian Intellectual Property Office in counterpart Russian Application No. 2014145867.
Communication dated Mar. 30, 2020, issued by the State Intellectual Property Office of P.R. China in counterpart Chinese Application No. 201810709489.8.
Communication dated Oct. 2, 2015 issued by the Russian Patent Office in counterpart Russian Patent Application No. 2014145867.
Communication dated Sep. 28, 2017, from the State Intellectual Property Office of People's Republic of China in counterpart Application No. 201380031852.0.
Communication dated Sep. 5, 2017, from the Japanese Patent Office in counterpart application No. 2016-206194.
Communication issued Jul. 27, 2021 by the State Intellectual Property Office of P.R. China in counterpart Chinese Patent Application No. 201810709489.8.
Communication issued Jun. 30, 2021 by the State Intellectual Property Office of P.R. China in counterpart Chinese Patent Application No. 201810708748.5.
Communication issued Mar. 29, 2017, issued by the Federal Service for Intellectual Property in counterpart Russian Patent Application No. 2016125239.
Hendry et al., "AHG21: Explicit Reference Pictures Signaling with Output Latency Count Scheme", Joint Collaborative Teamon Video Coding (JCT-VC) of ITU-T SG16 and ISO/IEC JTC1/SC29/WG11, 7th Meeting: Geneva, CH, Nov. 21-30, 2011, (17 Pages Total).
Il-Koo Kim et al; "Delta parameter derivation for inter reference picture set prediction"; Joint Collaborative Team on Video Coding (JCT-VC) of ITU-T SG 16 WP 3 and ISO/IEC JTC 1/SC 29/WG 11 9th Meeting; Apr. 27-May 7, 2015; pp. 1-5.
Miska M. Hannuksela; "AHG21: Removal of reference picture list modification"; Joint Collaborative Team on Video Coding (JCT-

(56) References Cited

OTHER PUBLICATIONS

VC) of ITU-T SG16 WP3 and ISO/IEC JTC1/SC29/WG11 8th Meeting; Feb. 1-10, 2012; 10 pgs. total.

Rickard Sojioberg et al., "Absolute Signaling of Reference Pictures", Joint Collaborative Team on Video Coding (JCT-VC) of ITU-T SG16 WP3 and ISO/IEC/ JTC1/SC29/WG116th Meeting: Torina, 2011., JCTVC-F493.

The Design in Compressing and Coding of Video Image by FPGA Based on DVI Interface.

Tk Tan et al; "AHG21: Inter reference picture set prediction syntax and semantics"; Joint Collaborative Team on Video Coding (JCT-VC) of ITU-T SG16 WP3 and ISO/IEC JTC1/SC26/WG11 7th Meeting; Nov. 21-30, 2011; pp. 1-7.

Communication, Issued by the International Searching Authority, Dated Aug. 22, 2013, In counterpart International Application No. PCT/KR2013/003181.

Sjoberg, et al., "JCT-VC AHG report: Reference picture buffering and list construction (AHG21)", Joint Collaborative Team on Video Coding (JCT-VC) of ITU-T SG16 WP3 and ISO/IEC JTC1/SC29/WG11, JCTVC-G021, 7th Meeting, Nov. 21, 2011-Nov. 30, 2011, Geneva, Switzerland, pp. 1-9.

FIG. 9

| | |
|---|---|
| 1 —— num_short_term_ref_pic_sets | ue(v) |
| for(i=0;i<num_short_term_ref_pic_sets;i++) | |
| 3 ——   short_term_ref_pic_set(i) | |
| long_term_ref_pics_present_flag | u(1) |

FIG. 10

| | |
|---|---|
| 5 —— short_term_ref_pic_set_sps_flag | u(1) |
| if(!short_term_ref_pic_set_sps_flag) | |
| 7 ——   short_term_ref_pic_set(num_short_term_ref_pic_sets) | |
| else | |
|   short_term_ref_pic_set_idx | u(v) |
| if(long_term_ref_pics_persent_flag){ | |
|   num_long_term_pics | ue(v) |
|   for(i=0;i<num_long_term_pics;i++){ | |
|     delta_poc_lsb_lt[i] | ue(v) |
|     delta_poc_msb_present_flag[i] | u(1) |
|     if(delta_poc_msb_present_flag[i]) | |
|       delta_poc_msb_cycle_lt_minus1[i] | ue(v) |
|     used_by_curr_pic_lt_flag[i] | u(1) |
|   } | |
| } | |

FIG. 11

| short_term_ref_pic_set(idx) { | Descriptor |
|---|---|
|   inter_ref_pic_set_prediction_flag | u(1) |
|   if(inter_ref_pic_set_prediction_flag) { | |
|     if(idx==num_short_term_ref_pic_sets) | |
|       derived_delta_rps_flag | u(1) |
|     if(!derived_delta_rps_flag) { | |
|       delta_idx_minus1 | ue(v) |
|       delta_rps_sign | u(1) |
|       abs_delta_rps_minus1 | ue(v) |
|     } | |
|     for(j=0;j<=NumDeltaPocs[RIdx];j++) { | |
|       used_by_curr_pic_flag[j] | u(1) |
|       if(!used_by_curr_pic_flag[j]) | |
|         use_delta_flag[j] | u(1) |
|     } | |
|   } | |
|   else { | |
|     num_negative_pics | ue(v) |
|     num_positive_pics | ue(v) |
|     for(i=0;i<num_negative_pics;i++) { | |
|       delta_poc_s0_minus1[i] | ue(v) |
|       used_by_curr_pic_s0_flag[i] | u(1) |
|     } | |
|     for(i=0;i<num_negative_pics;i++) { | |
|       delta_poc_s1_minus1[i] | ue(v) |
|       used_by_curr_pic_s1_flag[i] | u(1) |
|     } | |
|   } | |
| } | |

FIG. 12A

| # | Type | POC | QPoffset | QPfactor | temporal_id | ref_buf_size | ref_pic | #ref_pics | reference pictures | predict | deltaRI dx-1 | deltaRPS | #ref_idcs | reference idcs |
|---|---|---|---|---|---|---|---|---|---|---|---|---|---|---|
| Frame1: | B | 8 | 1 | 0.442 | 0 | 4 | 1 | 4 | -8 -10 -12 -16 | 0 | 0 | | | 1 1 0 0 1 |
| Frame2: | B | 4 | 2 | 0.3536 | 0 | 2 | 1 | 3 | -4 -6 4 | 1 | 0 | 4 | 5 | 1 1 0 1 1 |
| Frame3: | B | 2 | 3 | 0.3536 | 0 | 2 | 1 | 4 | -2 -4 2 6 | 1 | 0 | 2 | 4 | 1 0 1 1 |
| Frame4: | B | 1 | 4 | 0.68 | 0 | 2 | 0 | 4 | -1 1 3 7 | 1 | 0 | -1 | 5 | 1 1 1 1 0 |
| Frame5: | B | 3 | 4 | 0.68 | 0 | 2 | 0 | 4 | -1 -3 1 5 | 1 | 0 | -2 | 5 | 1 1 1 1 1 |
| Frame6: | B | 6 | 3 | 0.3536 | 0 | 2 | 1 | 4 | -2 -4 -6 2 | 1 | 0 | -3 | 5 | 1 0 1 1 1 |
| Frame7: | B | 5 | 4 | 0.68 | 0 | 2 | 0 | 4 | -1 -5 1 3 | 1 | 0 | 1 | 5 | 1 1 1 1 1 |
| Frame8: | B | 7 | 4 | 0.68 | 0 | 2 | 0 | 4 | -1 -3 -7 1 | 1 | 0 | -2 | 5 | 1 0 1 1 0 |

FIG. 12B

| # | Type | POC | QPoffset | QPfactor | temporal_id | ref_buf_size | ref_pic | #ref_pics | reference pictures | predict | deltaRI dx-1 | deltaRPS | #ref_idcs | reference idcs |
|---|---|---|---|---|---|---|---|---|---|---|---|---|---|---|
| Frame1: | B | 1 | 3 | 0.4624 | 0 | 4 | 1 | 4 | -1 -5 -9 -13 | 0 | | | | 1 1 1 0 1 |
| Frame2: | B | 2 | 2 | 0.4624 | 0 | 4 | 1 | 4 | -1 -2 -6 -10 | 1 | 0 | -1 | 5 | 1 1 1 1 1 |
| Frame3: | B | 3 | 3 | 0.4624 | 0 | 4 | 1 | 4 | -1 -3 -7 -11 | 1 | 0 | -1 | 5 | 0 1 1 1 1 |
| Frame4: | B | 4 | 4 | 0.578 | 0 | 4 | 1 | 4 | -1 -4 -8 -12 | 1 | 0 | -1 | 5 | 0 1 1 1 1 |

METHOD AND APPARATUS FOR DETERMINING REFERENCE PICTURE SET OF IMAGE

CROSS-REFERENCE TO RELATED APPLICATIONS

This application is a Continuation of U.S. application Ser. No. 17/956,203, filed on Sep. 29, 2022, which is a Continuation of U.S. application Ser. No. 17/231,763, filed Apr. 15, 2021 (now U.S. Pat. No. 11,490,091, issued Nov. 1, 2022), which is a Continuation of U.S. application Ser. No. 16/799,362 filed on Feb. 24, 2020 (now U.S. Pat. No. 11,006,120, issued May 11, 2021), which is a Continuation of U.S. application Ser. No. 16/207,656 filed on Dec. 3, 2018, now U.S. Pat. No. 10,609,378 issued on Mar. 31, 2020, which is a Continuation of U.S. application Ser. No. 14/394,820 filed on Oct. 16, 2014, now U.S. Pat. No. 10,171,811 issued on Jan. 1, 2019, which is a national stage application of International Application No. PCT/KR2013/003181 filed on Apr. 16, 2013, which claims the benefit of U.S. Provisional Application 61/624,468, filed on Apr. 16, 2012, in the United States Patent and Trademark Office, the disclosures of which are herein incorporated by reference in their entireties.

BACKGROUND

1 Field

One or more exemplary embodiments relate to a method and apparatus for determining a reference picture set (RPS) which is a set of reference pictures that are used in predictive decoding of a current picture that is to be decoded.

2. Related Art

Recently, with the development of digital display technology and the advent of high-quality digital televisions (TVs), a new codec for processing a large amount of video data has been proposed. Information of reference pictures which are used in predictive decoding of a current picture can be encoded and transferred to a decoding portion. The decoding portion can perform predictive decoding of the current picture by using the transferred information of the reference pictures.

SUMMARY

Exemplary embodiments relate to a method and apparatus for determining a reference picture set (RPS) which is a set of reference pictures that are used in predictive decoding of a current picture.

According to one or more exemplary embodiments, a method of determining an RPS which is a set of reference pictures that are used in predictive decoding of a current picture includes: determining whether or not to determine the RPS based on a delta RPS which is a difference value between a picture order count (POC) value of a reference picture included in a reference RPS which is one of pre-defined RPSs and is referred to in determining the RPS and a POC value of a reference picture included in the RPS; and determining the RPS based on a result of the determining.

The determining of the RPS may include: obtaining a flag indicating whether the RPS is determined based on the delta RPS which is determined based on POC values of the current picture and a previous picture or whether the RPS is determined based on an index of the reference RPS, which is an identification value of the reference RPS, and the delta RPS; and determining the RPS according to a value of the flag.

The RPS may be an RPS which is not pre-defined in a sequence parameter set (SPS).

The determining of the RPS may include: determining the delta RPS of the RPS, based on a difference value between the POC value of the current picture and the POC value of the previous picture; and determining the RPS based on the delta RPS of the RPS and an RPS used in predictive decoding of the previous picture.

The determining of the RPS may include: obtaining the delta RPS and the index of the reference RPS; obtaining the reference RPS based on the index of the reference RPS; and determining the RPS based on a value of the delta RPS added to POC values of the reference pictures included in the reference RPS.

The method may include: determining the RPS which is a set of reference pictures used in predictive decoding of a current picture that is to be decoded; determining whether to signal the RPS based on a delta RPS which is a difference value between a picture order count (POC) value of a reference picture included in a reference RPS which is one of pre-defined RPSs and is referred to in the determining of the RPS and a POC value of a reference picture included in the RPS; and signaling the RPS based on a result of the determining.

The signaling of the RPS may include: determining whether the RPS is determined based on the delta RPS which is determined based on POC values of the current picture and a previous picture or whether the RPS is determined based on an index of the reference RPS, which is an identification value of the reference RPS, and the delta RPS; and adding a flag to a predetermined domain of a bit stream according to a result of the determining.

The RPS may be an RPS which is not pre-defined in a sequence parameter set (SPS).

When the RPS is obtained based on the POC values of the current picture and the previous picture, the delta RPS of the RPS may be determined based on a difference value between the POC value of the current picture and the POC value of the previous picture and the RPS may be obtained based on the delta RPS of the RPS and an RPS used in predictive decoding of the previous image.

The method may further include adding the delta RPS and the index of the reference RPS to the predetermined domain of the bit stream, when the RPS is obtained based on the delta RPS and the index of the reference RPS, and the RPS may be obtained based on the reference RPS obtained based on the index of the reference RPS and the delta RPS.

According to the one or more of the above exemplary embodiments, a video decoding apparatus may obtain the delta RPS by using the POC difference value between the current picture and the previous picture, without the need of the delta RPS being explicitly encoded and transferred via the video encoding apparatus, in order to signal the delta RPS to obtain the RPS to be used in predictive decoding of the current picture. Therefore, the number of bits encoded in the video encoding apparatus may be reduced.

BRIEF DESCRIPTION OF THE DRAWINGS

FIG. 9 is a view of an example of a sequence parameter set (SPS) according to an exemplary embodiment.

FIG. 10 is a view of an example of a slice header according to an exemplary embodiment.

FIG. 11 is a view of an example of a short term RPS according to an exemplary embodiment.

FIGS. 12A and 12B are views of an example of an RPS of pictures according to an exemplary embodiment.

DETAILED DESCRIPTION OF EXEMPLARY EMBODIMENTS

Figure 1A:
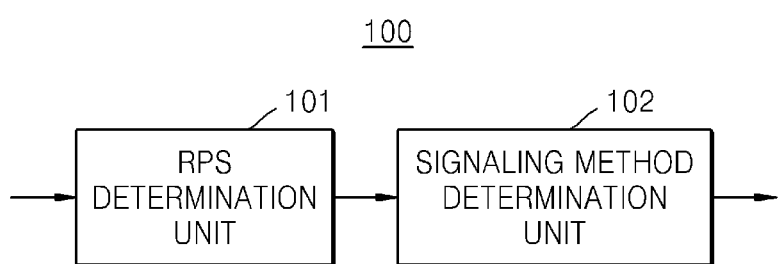
FIGS. 1A and 1B are block diagrams of an internal structure of a video encoding apparatus according to an exemplary embodiment.

Hereinafter, exemplary embodiments will be described in detail with reference to the attached drawings. Detailed descriptions of related well known functions or configurations will be omitted so as not to obscure the description of the exemplary embodiments. Like reference numerals in the drawings denote like elements.

The terms and words which are used in the present specification and the appended claims should not be limited to their common or dictionary meanings, but should be construed as having a meaning and concept fit to the technological concept and scope and of the exemplary embodiments. The presented exemplary embodiments and structures described in the drawings of the present specification are just exemplary, and they do not represent the entire technological concept and scope. Therefore, it should be understood that there can be many equivalents and modified embodiments that can substitute those described in this specification.

The exemplary embodiments may be applied to an encoding standard based on an arbitrary intra frame and an inter frame. The term "picture" used throughout the present specification is an inclusive term to denote various forms of video image information that may be known in the related art, such as a "frame," a "field," and a "slice."

A reference picture may be a picture that may be used for inter-prediction of a block in a current picture.

Generally, an encoding portion may identify reference pictures by using a picture order count (POC) value. The POC value represents a relative order of display of corresponding pictures. For example, a picture having a low POC value may be displayed earlier than a picture having a high POC value. The order of display and an order of decoding of pictures are different. The picture having the low POC value may not be decoded earlier than the picture having the high POC value. Also, the picture having the low POC value may be decoded earlier than the picture having the high POC value.

According to an exemplary embodiment, a description is made based on a High Efficiency Video Coding (HEVC) standard. However, it is not limited thereto, and may be applied to other video coding technologies. For example, a reference picture set (RPS) is described based on the HEVC standard, but the RPS may be applied to other standards.

Hereinafter, one or more exemplary embodiments will be described more fully with reference to the accompanying drawings.

Figure 1B:
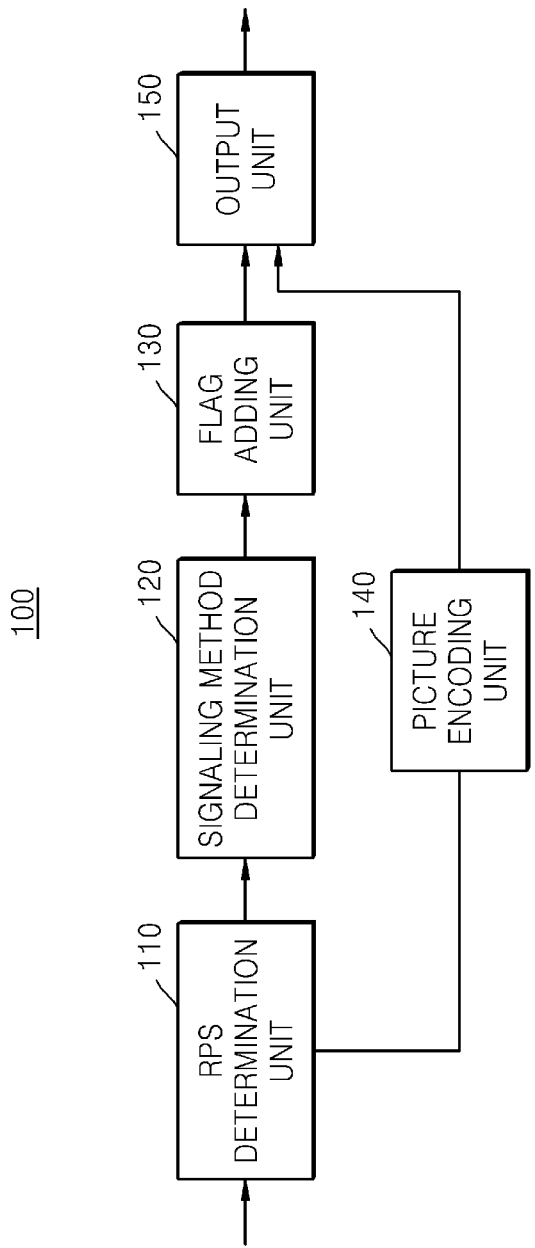

FIGS. 1A and 1B are block diagrams of an internal structure of a video encoding apparatus 100 according to an exemplary embodiment.

Referring to FIG. 1A, the video encoding apparatus 100 may include an RPS determination unit 101 (e.g. an RPS determiner, etc.) and a signaling method determination unit 102 (e.g., a signaling method determiner, etc.).

An RPS refers to a set of reference pictures which are capable of being used in predictive decoding of a current picture that is to be decoded. The RPS may be defined in a sequence parameter set (SPS) or a slice header. The SPS is header information including information regarding encoding of a sequence, such as a profile, a level, and the like. The SPS may include a plurality of RPSs that are capable of being identified as indexes. The slice header may include an additionally defined RPS in addition to the RPS defined in the SPS. The additionally defined RPS may be used in a picture corresponding to the slice header including the RPS.

The reference pictures included in the RPS may be indicated as a picture order count (POC) value based on the current picture. That is, when a POC value of the current picture for which the RPS may be used is set to 0, a POC value of the reference picture may be indicated. Although there may be a short term RPS and a long term RPS, the RPS hereinafter may be the short term RPS.

A method of defining the RPS in the slice header in the video encoding apparatus 100, that is, a method of signaling an RPS, includes an inter-RPS prediction method. According to the inter-RPS prediction method, the video encoding apparatus 100 may signal the RPS in the slice header to obtain an RPS to be used in predictive decoding of the current picture by referring to one of RPSs pre-defined in the SPS. In detail, the video encoding apparatus 100 may signal the RPS by adding a delta RPS of the RPS and an index of an RPS that may be referred to in determining the RPS to a bit stream. The RPS may be obtained in a decoding portion by adding the delta RPS, which is a difference between the reference RPS and the RPS to the reference RPS. That is, the RPS may be obtained by adding the delta RPS to each of POC values of reference pictures included in the reference RPS. The reference RPS is a value pre-defined in the SPS and may be identified as an index.

According to an exemplary embodiment, the delta RPS of the RPS that is to be used in predictive decoding of the current picture may be obtained by the fact that the delta RPS of the RPS that is to be used in predictive decoding of the current picture is the same as a difference between a POC value of the current picture and a POC value of a previous picture. Here, the previous picture may refer to a picture previous to the current picture, on a basis of an order of encoding. This is because the reference picture of the current picture should be a reference picture of a picture previously output or a reference picture of a picture previously decoded. Thus, according to the exemplary embodiment, the delta RPS of the RPS may be obtained by a POC difference between the previously decoded picture and the current picture. Accordingly, the video encoding apparatus 100 may signal the RPS used in predictive decoding of the current picture without adding the delta RPS and the index of the reference RPS to the bit stream. Here, the decoding portion may obtain the delta RPS of the RPS by the difference between the POC values of the current picture and the previous picture and obtain an RPS used in predictive decoding of the previous picture, in order to obtain the RPS to be used in predictive decoding of the current picture from the delta RPS and the RPS used in predictive decoding of the previous picture.

The video encoding apparatus 100 according to the exemplary embodiment may determine the RPS to be used in predictive decoding of the current picture and may add a flag to the bit stream based on the method of signaling the RPS. Also, the video encoding apparatus 100 may encode the current picture by using the determined RPS.

The RPS determination unit 101 may determine the RPS to be used in predictive decoding of the current picture. The determined RPS may be signaled according to a signaling method determined by the signaling method determination unit 102.

The signaling method determination unit 102 may determine whether to signal the RPS based on the delta RPS and may signal the RPS based on a result of the determination, in order to signal the RPS determined by the RPS determination unit 101.

Referring to FIG. 1B, the video encoding apparatus 100 according to the present embodiment may include an RPS determination unit 110 (e.g., an RPS determiner, etc.), a signaling method determination unit 120 (e.g., a signaling method determiner, etc.), a flag adding unit 130 (e.g., a flag adder, etc.), a picture encoding unit 140 (e.g., a picture encoder, etc.) and an output unit 150 (e.g., an output, etc.). The RPS determination unit 110 and the signaling method determination unit 120 of FIG. 1B respectively correspond to the RPS determination unit 101 and the signaling method determination unit 102 of FIG. 1A, and thus, their detailed descriptions will be omitted. The RPS determination unit 110 may determine the RPS to be used in predictive decoding of the current picture.

The signaling method determination unit 120 may determine the method of signaling the RPS to be used in predictive decoding of the current picture. The signaling method determination unit 120 may determine whether to determine the RPS based on the delta RPS and may determine the method of signaling the RPS based on a result of the determination. According to an exemplary embodiment, there are two methods of signaling the RPS based on the delta RPS. According to the first signaling method, in the video encoding apparatus 100, the decoding portion may determine the delta RPS based on POC values of the current picture and the previous picture and may signal the RPS to determine the RPS to be used in predictive decoding of the current picture, based on the determined delta RPS. Also, according to the second signaling method, in the video encoding apparatus 100, the decoding portion may signal the RPS to determine the RPS to be used in predictive decoding of the current picture based on the delta RPS and an index of the reference RPS used in predictive decoding of the current picture. The decoding portion may obtain the reference RPS by using the index of the reference RPS transferred from the video encoding apparatus 100, and may determine the RPS to be used in predictive decoding of the current picture based on the delta RPS and the reference RPS.

The flag adding unit 130 may add a flag to a bit stream according to a signaling method determined by the signaling method determination unit 120. In detail, the flag adding unit 130 may add flag values, which differ according to the first signaling method and the second signaling method, to the bit stream For example, the flag adding unit 130 may set the flag value to 1 in the case where the RPS to be used in predictive decoding of the current picture is signaled by the first signaling method. The flag adding unit 130 may set the flag value to 0 in the case where the RPS to be used in predictive decoding of the current picture is signaled by the second signaling method. Thus, the decoding portion may determine the signaling method based on the flag value and determine the RPS to be used in predictive decoding of the current picture based on the determined signaling method.

The picture encoding unit 140 may encode the current picture by using the RPS determined by the RPS determination unit 110. The encoded picture may be converted to a bit stream to be transferred to a video decoding apparatus 200 via the output unit 150.

The output unit 150 may output the encoded picture and a bit stream associated with information necessary for decoding the picture. The flag added to the bit stream by the flag adding unit 130 is the information necessary for decoding pictures and may be output by the output unit 150 by being added to the bit stream.

Figure 2A:
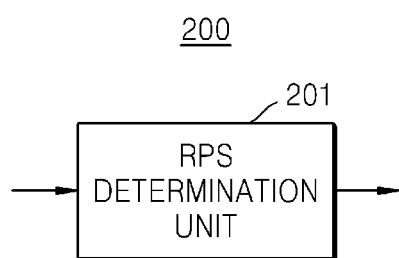
FIGS. 2A and 2B are block diagrams of an internal structure of a video decoding apparatus according to an exemplary embodiment.
Figure 2B:
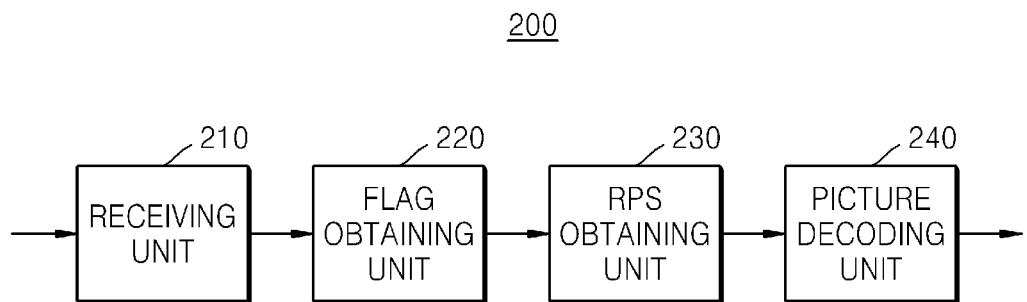

FIGS. 2A and 2B are block diagrams of an internal structure of the video decoding apparatus 200 according to an exemplary embodiment.

Referring to FIG. 2A, the video decoding apparatus 200 may include an RPS determination unit 201 (e.g., an RPS determiner, etc.).

The RPS determination unit 201 may determine whether to determine an RPS based on a delta RPS and determine the RPS based on a result of the determination, in order to determine the RPS which is a set of reference pictures that are used in predictive decoding of a current picture.

Referring to FIG. 2B, the video decoding apparatus 200 may include a receiving unit 210 (e.g., a receiver, etc.), a flag obtaining unit 220 (e.g., a flag obtainer, etc.), an RPS determination unit 230 (e.g., an RPS determiner, etc.), and a picture decoding unit 240 (e.g., a picture decoder, etc.). The RPS determination unit 230 of FIG. 2B corresponds to the RPS determination unit 201 of FIG. 2A, and thus, its description will not be repeated here.

The receiving unit 210 may receive a bit stream with respect to an encoded picture to perform parsing.

The flag obtaining unit 220 may obtain a flag to obtain an RPS in the bit stream for which the parsing is performed. According to a value of the flag, the RPS to be used in predictive decoding of the current picture is determined based on POC values of the current picture and a previous picture, according to the first signaling method. Alternatively, the RPS to be used in predictive decoding of the current picture is determined based on the delta RPS and an index of a reference RPS transferred from the video encoding apparatus 100, according to the second signaling method.

The RPS determination unit 230 may determine the RPS to be used in predictive decoding of the current picture according to the flag obtained by the flag obtaining unit 220. According to the first signaling method, the RPS determination unit 230 may determine the delta RPS of the RPS based on a difference value between the POC values of the current picture and the previous picture, and may determine an RPS used in predictive decoding of the previous picture. In addition, the RPS determination unit 230 may add the determined delta RPS to the RPS used in predictive decoding of the previous picture in order to determine the RPS to be used in predictive decoding of the current picture. That is, the RPS may be determined based on a value of the delta RPS added to each of POC values of reference pictures included in the RPS used in predictive decoding of the previous picture. Also, according to the second signaling method, the RPS determination unit 230 may obtain a reference RPS by using an index of the reference RPS transferred from the video encoding apparatus 100. Also, the RPS determination unit 230 may obtain the RPS to be used in predictive decoding of the current picture by adding the delta RPS transferred from the video encoding apparatus 100 to the reference RPS. That is, the RPS may be determined based on the value of the delta RPS added to each of the POC values of the reference pictures included in the reference RPS.

The picture decoding unit 240 may decode a picture by using the RPS determined by the RPS determination unit 230.

Figure 3:
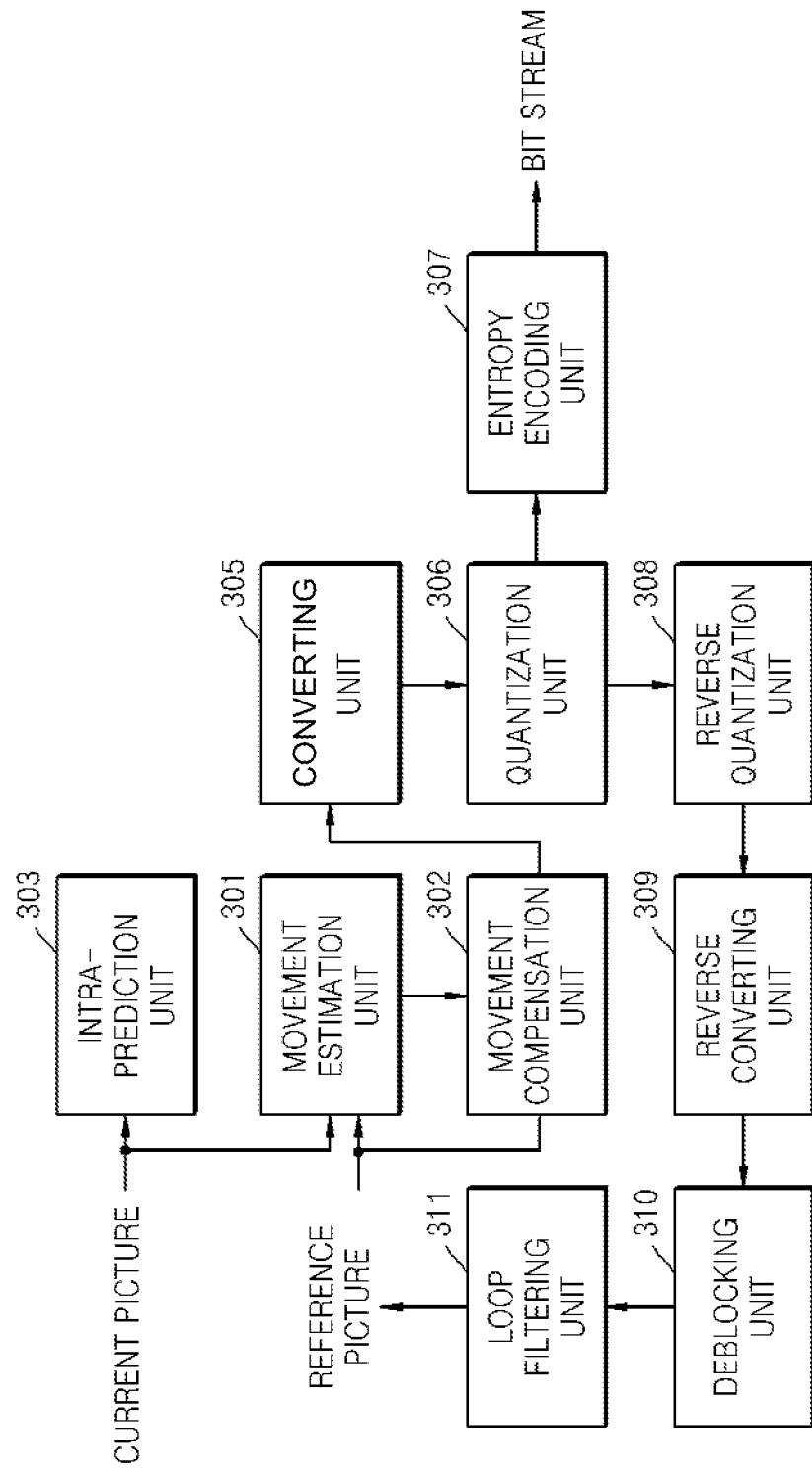
FIG. 3 is a block diagram of an internal structure of a picture encoding unit according to an exemplary embodiment.

FIG. 3 is a block diagram of an internal structure of a picture encoding unit 300 according to an exemplary embodiment.

Referring to FIG. 3, the picture encoding unit 300 may include a movement estimation unit 301 (e.g., a movement estimator, etc.), a movement compensation unit 302 (e.g., a movement compensator, etc.), an intra-prediction unit 303 (e.g., an intra-predictor, etc.), a converting unit 305 (e.g., a converter, etc.), a quantization unit 306 (e.g., a quantizer, etc.), an entropy encoding unit 307 (e.g., an entropy encoder, etc.), a reverse quantization unit 308 (e.g., reverse quantizer, etc.), a reverse converting unit 309 (e.g., a reverse converter, etc.), a deblocking unit 310 (e.g., a deblocker, etc.), and a loop filtering unit 311 (e.g., a loop filterer, etc.). The picture encoding unit 300 of FIG. 3 may correspond to the picture encoding unit 140 of FIG. 1.

The movement estimation unit 301 may estimate the movement of the current picture by using reference pictures included in an RPS with respect to a current picture which is a picture currently input from the outside among pictures forming a video.

The movement compensation unit 302 may generate a predictive picture of the current picture by using the reference pictures included in the RPS with respect to the current picture. In more detail, the movement compensation unit 302 may generate the predictive picture of the current picture by using the movement of the current picture, which is estimated by the movement estimation unit 301.

The intra-prediction unit 303 may predict each of intra mode blocks among blocks forming the current picture to generate the predictive picture of the current picture.

The converting unit 305 may convert a residual picture, which is calculated by subtracting the predictive picture from the current picture, from a spatial domain to a frequency domain. For example, the converting unit 305 may convert the residual picture from the spatial domain to the frequency domain by using an integer transform of the discrete Hadamard transform (DHT) and discrete cosine transform (DCT).

The quantization unit 306 may quantize frequency coefficients of the residual picture converted by the converting unit 305.

The entropy encoding unit 307 may generate a bit stream by entropy-encoding results of quantization by the quantization unit 306. In particular, the entropy encoding unit 307 may entropy encode information for video decoding, for example, RPS information used in inter-prediction, movement vector information, location information of neighboring blocks used in intra-prediction, in addition to the results of quantization by the quantization unit 306.

The reverse quantization unit 308 may reverse-quantize the results of quantization by the quantization unit 306.

The reverse converting unit 309 may convert results of quantization by the reverse quantization unit 308. That is, the reverse converting unit 309 may convert conversion coefficient values from a frequency domain to a spatial domain to restore the residual picture of the current picture and the predictive picture.

The deblocking unit 310 and the loop filtering unit 311 may adaptively perform filtering for the picture restored by the reverse quantization unit 308.

Figure 4:
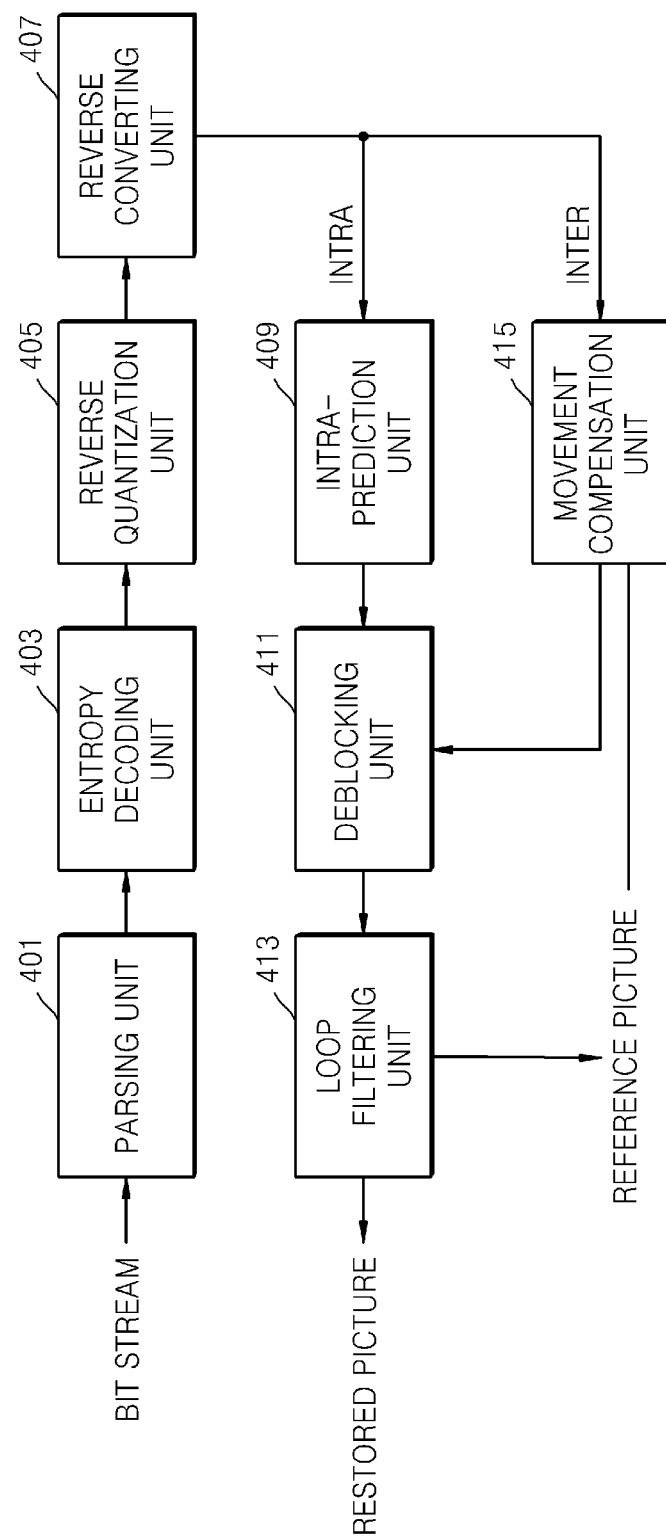
FIG. 4 is a block diagram of an internal structure of a picture decoding unit according to an exemplary embodiment.

FIG. 4 is a block diagram of an internal structure of a picture decoding unit according to an exemplary embodiment.

Referring to FIG. 4, the picture decoding unit 400 may include a parsing unit 401 (e.g., a parser, etc.), an entropy decoding unit 403 (e.g., an entropy decoder, etc.), a reverse quantization unit 405 (e.g., a reverse quantizer, etc.), a reverse converting unit 407 (e.g., a reverse converter, etc.), an intra-prediction unit 409 (e.g., an intra-predictor, etc.), a movement compensation unit 415 (e.g., a motion compensator, etc.), a deblocking unit 411 (e.g., a deblocker, etc.), and a loop filtering unit 413 (e.g., a loop filterer, etc.). The picture decoding unit 400 of FIG. 4 may correspond to the picture decoding unit 240 of FIG. 2.

The parsing unit 401 may perform parsing with respect to data of an encoded picture which is to be decoded and with respect to information related to decoding, which is necessary for encoding, from a bit stream.

The entropy decoding unit 403 may restore information for video decoding by entropy decoding the bit stream.

The reverse quantization unit 405 may restore conversion coefficient values by reverse quantizing values restored by the entropy decoding unit 403.

The reverse converting unit 407 may restore a residual picture of a current picture and a predictive picture by converting the conversion coefficient values restored by the reverse quantization unit 402 from a frequency domain to a spatial domain.

The intra-prediction unit 409 may generate the predictive picture of the current picture by predicting a value of a block of the current picture from a value of a restored block located neighboring a block of the current picture. The restored picture may be generated by adding the residual picture to the predictive picture.

The movement compensation unit 415 may generate the predictive picture of the current picture from reference pictures included in an RPS to be used in predictive decoding of the current picture. The restored picture may be generated by adding the residual picture to the predictive picture.

The deblocking unit 411 and the loop filtering unit 413 may adaptively perform filtering for the restored picture.

Figure 5:
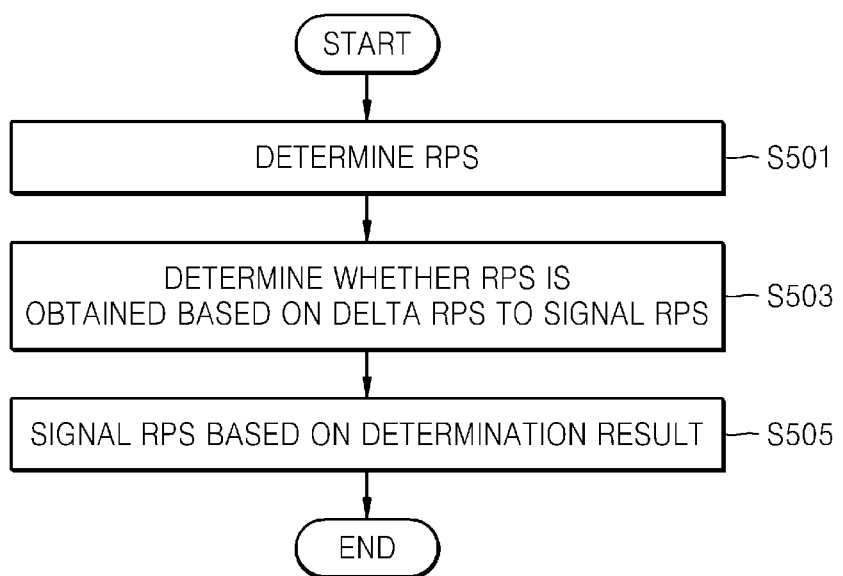
FIGS. 5 and 6 are flowcharts illustrating a method of signaling a reference picture set (RPS) according to an exemplary embodiment.

FIG. 5 is a flowchart illustrating a method of signaling an RPS according to an exemplary embodiment.

Referring to FIG. 5, the picture encoding apparatus 100 according to an exemplary embodiment may determine an RPS to be used in predictive decoding of a current picture in operation S501. That is, the picture encoding apparatus 100 may determine the RPS which is a set of pictures to be referred to in encoding the current picture. The picture encoding apparatus 100 may determine the RPS by referring to an index of one of RPSs defined in an SPS or may additionally define an RPS in a slice header in addition to the RPS defined in the SPS. According to an exemplary embodiment, in the case where an additional RPS is defined in the slice header in addition to the RPS defined in the SPS, the RPS may be defined by first and second signaling methods that will be described later.

The picture encoding apparatus 100 may determine whether the RPS is obtained based on a delta RPS in operation S503.

The picture encoding apparatus 100 may signal the RPS based on a result of the determination of operation S503, in operation S505.

Figure 6:
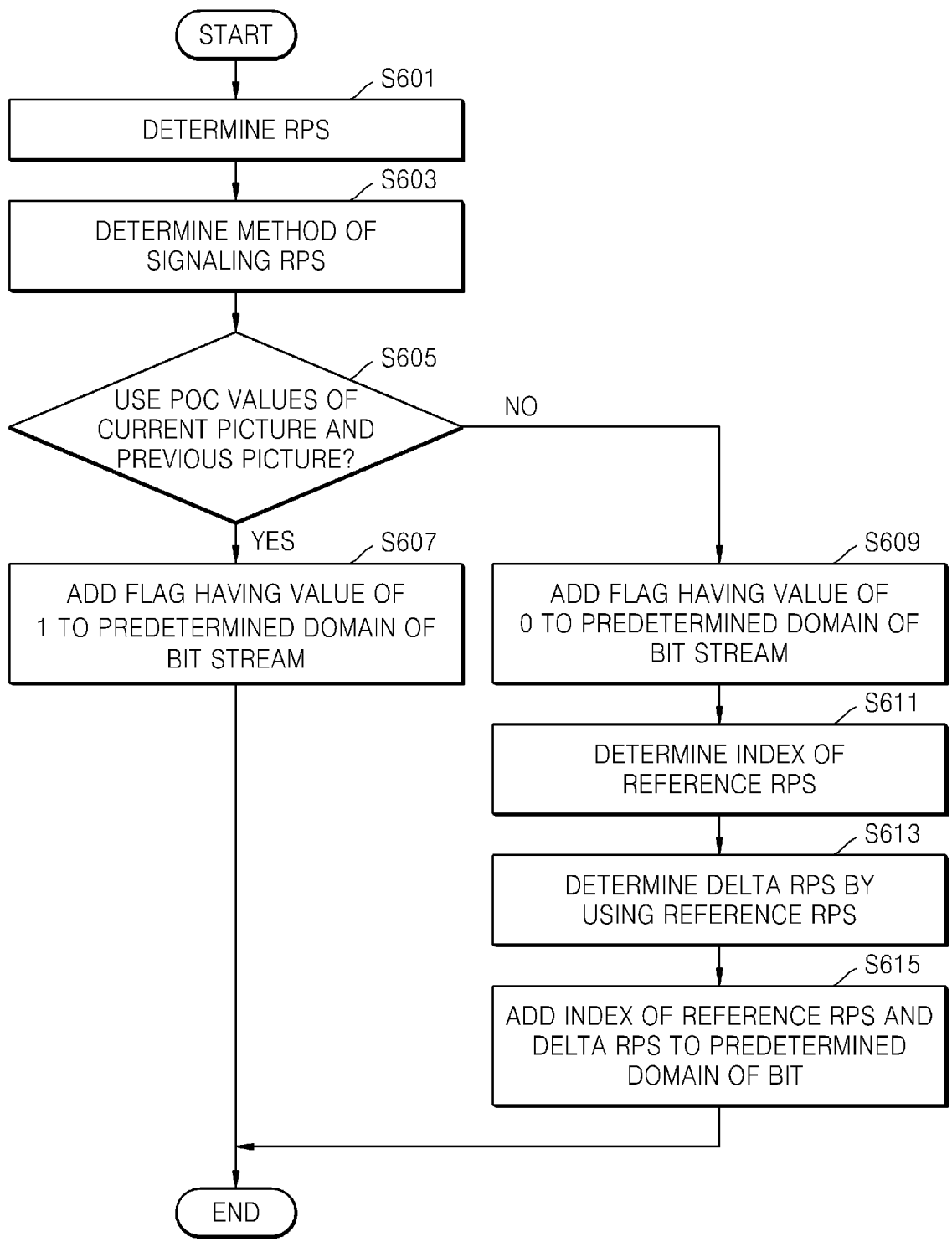

FIG. 6 is a flowchart illustrating a method of signaling an RPS according to an exemplary embodiment.

Referring to FIG. 6, the picture encoding apparatus 100 may signal an RPS to be used in predictive encoding of a current picture based on a delta RPS, in operation S601.

In the case where the picture encoding apparatus 100 signals the RPS based on the delta RPS, the picture encoding apparatus 100 may determine whether the RPS is obtained based on a difference value between POC values of a current picture and a previous picture in order to signal the RPS to be used in predictive decoding of the current picture according to the first method of signaling the RPS to be used in predictive decoding of the current picture, or whether the RPS is obtained based on the delta RPS of the RPS and an index of a reference RPS that may be referred to in determining the RPS in order to signal the RPS to be used in predictive decoding of the current picture according to the second method of signaling the RPS to be used in predictive decoding of the current picture, in operation S603. Here, the reference RPS may be one of RPSs pre-defined in an SPS and may be identified as an index of the reference RPS. The picture encoding apparatus 100 may determine one of the two signaling methods, which has better encoding efficiency. For example, the picture encoding apparatus 100 may determine the method of signaling the RPS based on a rate distortion cost. When the RPS is signaled by the first signaling method according to which the RPS is obtained based on the difference value between the POC values of the current picture and the previous picture in operation S605, a flag having a value of 1 may be added to a predetermined domain of a bit stream in operation S607. By this, the RPS to be used in predictive decoding of the current picture may be signaled.

When the RPS to be used in predictive decoding of the current picture is signaled by the second signaling method according to which the delta RPS and the index of the reference RPS are signaled in operation S605, a flag having a value of 0 may be added to a predetermined domain of the bit stream in operation S609.

According to the second signaling method, the picture decoding apparatus 200 needs the delta RPS of the current picture and the index of the reference RPS in order to obtain the RPS to be used in predictive decoding of the current picture by an inter-RPS method, and thus, the delta RPS of the current picture that is encoded and the index of the reference RPS need to be added to the bit stream.

The picture decoding apparatus 100 may determine the index of the reference RPS to be referred to in obtaining the RPS to be used in predictive decoding of the current picture in operation S611. Here, the picture decoding apparatus 100 may determine the index of the reference RPS based on encoding efficiency. The reference RPS is pre-defined in the SPS and may be identified as an index of each RPS.

The picture encoding apparatus 100 may obtain the delta RPS by using the index of the reference RPS determined in operation S611, in operation S613. The picture encoding apparatus 100 may obtain the reference RPS defined in the SPS by using the index of the reference RPS and may obtain the delta RPS by obtaining a difference between the obtained reference RPS and the RPS to be used in predictive decoding of the current picture.

In addition, a value indicating a reference picture of the reference RPS to which the delta RPS is applied may be defined in operation S613. For example, when the reference RPS is {−1, 1, 3, 5}, the RPS to be used in predictive decoding of the current picture and to be signaled is {−2, 0, 2}, and a value of the delta RPS is −1, the determined RPS may have the same value as the RPS of {−2, 0, 2} only when the delta RPS is not applied to a POC value of a fourth reference picture when applying the delta RPS to the reference RPS. Thus, {1, 1, 1, 0} in which a fourth value for the fourth reference picture is 0 may be defined as a value indicating the reference picture to which the delta RPS is applied. The value indicating the reference picture to which the delta RPS is applied may be defined and signaled by the first signaling method as well as the second signaling method.

The picture encoding apparatus 100 may signal the RPS to be used in prediction decoding of the current picture by encoding the index of the reference RPS and the delta RPS to add to the predetermined domain of the bit stream in operation S615.

Figure 7:
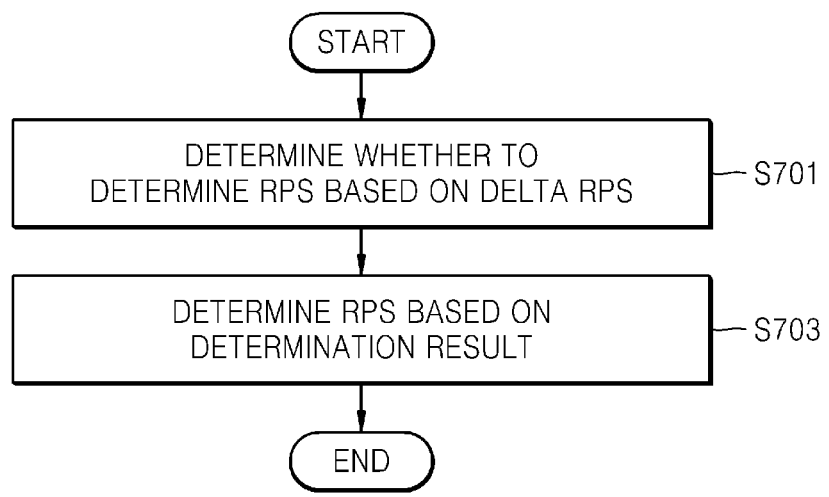
FIGS. 7 and 8 are flowcharts illustrating a method of determining an RPS according to an exemplary embodiment.

FIG. 7 is a flowchart illustrating a method of determining an RPS according to an exemplary embodiment.

Referring to FIG. 7, the picture decoding apparatus 200 may determine whether to determine the RPS based on a delta RPS, in order to determine an RPS to be used in predictive decoding of a current picture, in operation S701.

In operation S703, the picture decoding apparatus 200 may determine the RPS based on a result of the determination of operation S701.

Figure 8:
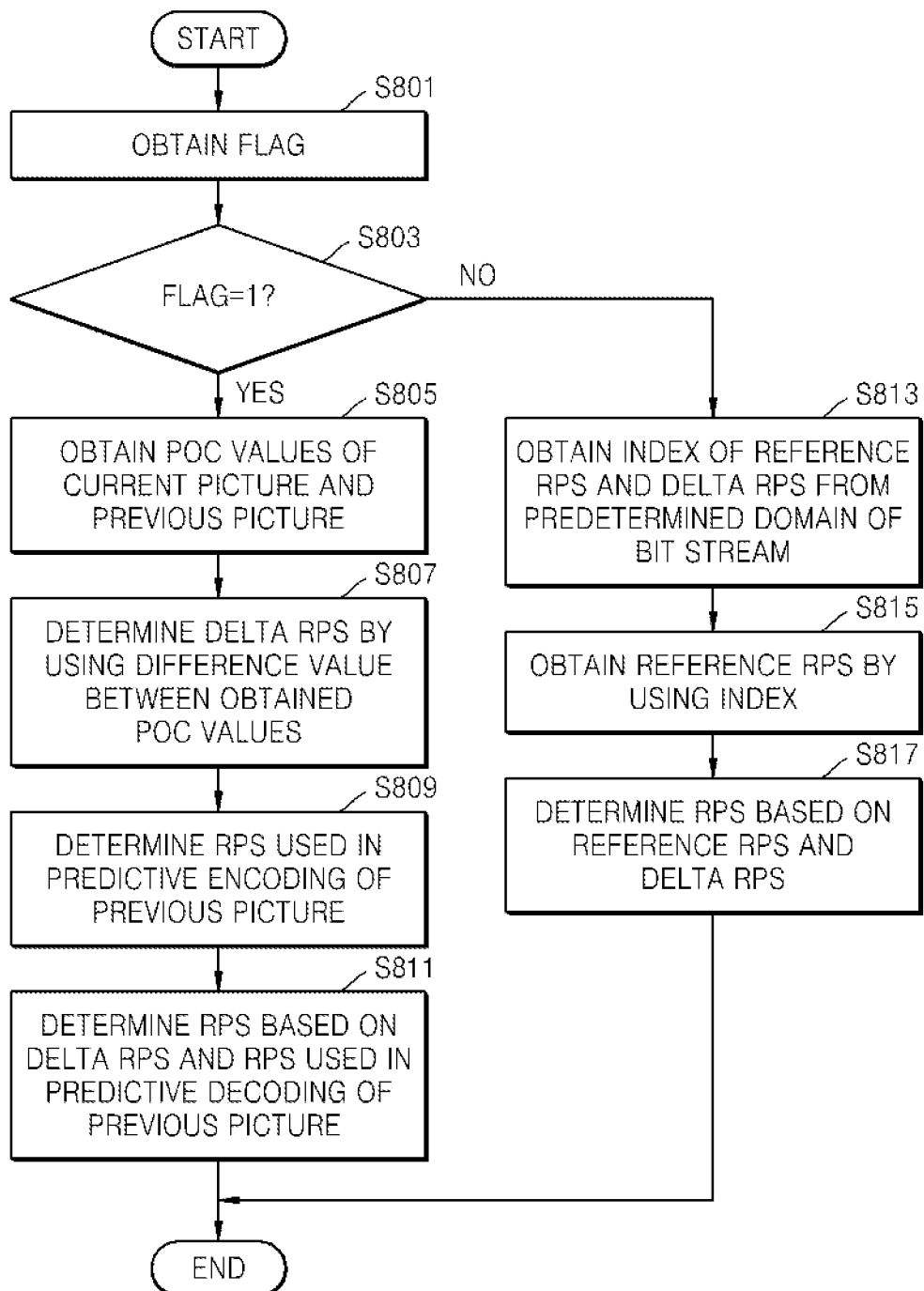

FIG. 8 is a flowchart illustrating a method of determining an RPS according to an exemplary embodiment.

Referring to FIG. 8, when the picture decoding apparatus 200 determines the RPS based on the delta RPS, the picture decoding apparatus 200 may obtain a flag indicating whether a first signaling method or a second signaling method is used to determine the RPS to be used in predictive decoding of the current picture, in operation S801.

When the flag is 1 in operation S803, the picture decoding apparatus 200 may determine the RPS to be used in predictive decoding of the current picture by using the first signaling method.

The picture decoding apparatus 200 may obtain POC values of the current picture and a previous picture according to the first signaling method, in operation S805.

The picture decoding apparatus 200 may obtain the delta RPS of the current picture by using the obtained POC value in operation S807. That is, the picture decoding apparatus 200 may determine a difference value between the POC value of the current picture and the POC value of the previous picture as the delta RPS of the RPS to be used in predictive decoding of the current picture.

The picture decoding apparatus 200 may obtain an RPS used in predictive decoding of the previous picture, where the RPS is capable of being used as a reference RPS to obtain the RPS, in operation S809.

The picture decoding apparatus 200 may obtain the RPS by using the delta RPS and the RPS used in predictive decoding of the previous picture, in operation S811. That is, the picture decoding apparatus 200 may obtain the RPS by adding the delta RPS to POC values of reference pictures included in the RPS used in predictive decoding of the previous picture. Here, the RPS may be obtained by further using a value indicating the reference picture to which the delta RPS is applied.

Meanwhile, when the flag is 0 in operation S803, the picture decoding apparatus 200 may determine the RPS to be used in predictive decoding of the current picture by using the second signaling method.

The picture decoding apparatus 200 may obtain an index of the reference RPS and the delta RPS from a predetermined domain of a bit stream, in operation S813.

The picture decoding apparatus 200 may obtain the reference RPS by using the index of the reference RPS obtained in operation S813, in operation S815. The reference RPS may be a value pre-defined in an SPS, which may be identified as an index.

The picture decoding apparatus 200 may determine the RPS to be used in predictive decoding of the current picture based on the reference RPS and the delta RPS in operation S817. That is, the picture decoding apparatus 200 may obtain the RPS to be used in predictive decoding of the current picture by adding the delta RPS to POC values of reference pictures of the reference RPS. Here, the RPS to be used in predictive decoding of the current picture may be determined based on a value indicating the reference picture of the reference RPS to which the delta RPS may be applied.

FIG. 9 is a view of an example of an SPS according to an exemplary embodiment.

Referring to FIG. 9, num_short_term_ref_pic_sets (1) may be defined in the SPS as the number of a short term RPS, and short_term_ref_pic_set (i) (3) may be defined in the SPS as much as a value of num_short_term_ref_pic_sets (1). As described earlier, an RPS which is a set of reference pictures that are used in predictive decoding of a picture may be defined in the SPS, and each RPS may be identified as an index.

FIG. 10 is a view of an example of a slice header according to an exemplary embodiment.

Referring to FIG. 10, when the short term RPS is defined in the slice header, 0 may be added to a value of short_term_ref_pic_set_flag (5). When the value of short_term_ref_pic_set_sps_flag (5) is 0, the short term RPS may be defined in short_term_ref_pic_set (num_short_term_ref_pic_sets) (7) of the slice header. The RPS defined in the slice header may be a value other than the RPS defined in the SPS.

FIG. 11 is a view of an example of a short term RPS according to an exemplary embodiment.

Referring to FIG. 11, the short term RPS that may be defined in the slice header illustrated in FIG. 10 may be defined in short_term_ref_pic_set (idx).

A value of inter_ref_pic_set_prediction_flag (9) may be determined based on whether or not the RPS is defined by an inter RPS method.

In the case where, if the value of inter_ref_pic_set_prediction_flag is 1 in if (inter_ref_pic_set_prediction_flag) (11), idx is num_short_term_ref_pic_sets (13), that is, in the case where an index of the RPS is the same as the number of the short RPSs defined in the SPS, a value of derived_delta_rps_flag (15) may be determined.

The index of the short term RPS defined in the SPS may have a value in a range of 0 to num_short_term_ref_pic_sets-1. Thus, the case where the index of the RPS is the same as the number of the short term RPSs defined in the SPS is the case where an RPS which is not defined in the SPS is defined in the slice header. That is, the value of derived_delta_rps_flag (15) may be determined in the case where the RPS which is not defined in the SPS is defined in the slice header.

The value of derived_delta_rps_flag (15) may correspond to the flag that may be obtained by being added to the bit stream according to an exemplary embodiment. Also, the RPS may be signaled based on the value of derived_delta_rps_flag (15).

In the case where derived_delta_rps_flag (15) is 0 (17), the video decoding apparatus 200 may obtain the RPS to be used in predictive decoding of the current picture by using the delta RPS and the index of the reference RPS.

In the case where derived_delta_rps_flag (15) is 1, the delta RPS and the index of the reference RPS may be obtained from delta_idx_minus1 (19), delta_rps_sign (21), and abs_delta_rps_minus1 (23) by Equations 1 and 2 below.

$$DeltaRPS=(1-2*delta\_rps\_sign)*(abs\_delta\_rps\_minus1+1) \qquad \text{[Equation 1]}$$

$$RIdx=idx-(delta\_idx\_minus1+1) \qquad \text{[Equation 2]}$$

In Equations 1 and 2, DeltaRPS denotes the delta RPS and RIdx denotes the index of the reference RPS.

delta_rps_sign (21) may have a value of 0 or 1, and each value may denote a negative number or a positive number. abs_delta_rps_minus1 (23) is a value in which 1 is subtracted from the delta RPS.

idx denotes an index of the short term RPS defined in the slice header, and delta_idx_minus1 (19) is a delta index value, which is a value obtained by subtracting 1 from a difference value between the RPS and the index of the reference RPS.

FIGS. 12A and 12B are views of an example of an RPS of pictures according to an exemplary embodiment. FIG. 12A illustrates a frame decoded by a random access in which a decoding order and a POC are not the same, and FIG. 12B illustrates a frame decoded by a low delay in which the decoding order and the POC are the same.

Referring to FIGS. 12A and 12B, the POC 25 and 31, reference pictures 27 and 33, and delta RPSs 29 and 35 are indicated for each frame. Frame numbers are in accordance with the decoding order.

The delta RPSs 29 and 35 are each a difference value between POC values of reference pictures included in a reference RPS and reference pictures included in an RPS to be used in predictive decoding of a current picture. Here, the POC values of the reference pictures are on the basis of the current picture of 0. The reference RPS for each frame illustrated in FIG. 12A is an RPS used in predictive decoding of a frame previously decoded. Thus, referring to the reference pictures 27 and 33, the RPS used in predictive decoding of a previous picture and the RPS used in predictive decoding of the current picture has a difference that is the same as the delta RPS 29.

For example, the RPS of frame 4 is {−1, 1, 3, 7} and the RPS of frame 5 is {−1, −3, 1, 5} in FIG. 12A. Also, the delta RPS of frame 5 is −2. Thus, the RPS of frame may be obtained by adding the delta RPS to RPS of FIG. 4. That is, the RPS of frame may be {−1−2=−3, 1−2=−1, 3−2=1, 7−2=5}. However, the case where the delta RPS is added to the POC value of the RPS may be restricted by a value of reference idcs 30. That is, the RPS to be used in predictive decoding of the current picture may be obtained by adding the delta RPS only to the POC value in which the value of the reference idcs 30 is 1. The value of the reference idcs 30 and 36 may correspond to a value indicating a reference picture of the RPS to which the delta RPS may be applied.

Meanwhile, when comparing the delta RPSs 29 and 35 and the POC 25 and 31, a difference value between the current picture and the previous picture is the same as the delta RPSs 29 and 35 for each frame. This is because a reference picture of the current picture should be a reference picture of a picture previously output or a reference picture of a picture previously decoded. Thus, according to the one or more of the above exemplary embodiments, the video decoding apparatus 200 may obtain the delta RPS of the RPS to be used in predictive decoding of the current picture by using a POC difference value between the picture previously decoded and the current picture, without the need of the delta RPS being explicitly encoded and transferred.

As described above, according to the one or more of the above exemplary embodiments, the video decoding apparatus 200 may obtain the delta RPS by using the POC difference value between the current picture and the previous picture, without the need of the delta RPS being explicitly encoded and transferred via the video encoding apparatus 100, in order to signal the delta RPS to obtain the RPS to be used in predictive decoding of the current picture. Therefore, the number of bits encoded in the video encoding apparatus 100 may be reduced.

Exemplary embodiments may also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

It should be understood that the exemplary embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An apparatus of decoding a video, the apparatus comprising:
at least one processor configured to:
obtain, from a bitstream, information regarding a number of short term reference picture sets included in a part of the bitstream about a sequence parameter set,
determine whether a current index of a short term reference picture set of a current picture is equal to the number of short term reference picture sets included in the part of the bitstream about the sequence parameter set,
when the current index of the short term reference picture set of the current picture is equal to the number of short term reference picture sets, obtain, from the bitstream, delta index information about a difference between the current index of the short term reference picture set of the current picture and an index of a reference short term reference picture set, information about a sign of a delta RPS and information about an absolute value of the delta RPS,
determine the index of the reference short term reference picture set which indicates the reference short term reference picture set based on the delta index information and the current index of the short term reference picture set,
determine the delta RPS based on the information about the sign of the delta RPS and the information about the absolute value of the delta RPS,
determine delta picture order count (POC) values between POC values of reference pictures included in the short term reference picture set of the current picture and a POC value of the current picture by adding each delta POC value between the POC value of reference picture in the reference short term reference picture set and the POC value of the current picture to the delta RPS,
determine the POC values of the reference pictures included in the short term reference picture set of the current picture based on the POC value of the current picture and the delta POC values between the POC values of the reference pictures included in the short term reference picture set of the current picture and the POC value of the current picture, and
predictive decode the current picture by using a reference picture included in one of reference picture sets including the short term reference picture set of the current picture,
wherein the current index of the short term reference picture set of the current picture being equal to the number of short term reference picture sets indicates the short term reference picture set regarding the current index is not defined in the sequence parameter set and is defined in a slice header.

2. An apparatus of encoding a video, the apparatus comprising:
at least one processor configured to:
determine short term reference picture sets available to predict a current picture,
generate information regarding a number of short term reference picture sets included in a part of a bitstream about a sequence parameter set,
generate delta index information about a difference between a current index of a short term reference picture set of the current picture and an index of a reference short term reference picture set, and generating information about a sign of a delta RPS and information about an absolute value of the delta RPS,
wherein the delta index information, the information about the sign of the delta RPS and the information about the absolute value of the delta RPS are generated and are included in the bitstream to determine the index of the reference short term reference picture set, determine the delta RPS, and determine delta picture order count (POC) values between POC values of reference pictures included in the short term reference picture set of the current picture and a POC value of the current picture by adding each delta POC value between the POC value of reference picture in the reference short term reference picture set and the POC value of the current picture to the delta RPS, and determine POC values of the reference pictures included in the short term reference picture set of the current picture based on the POC value of the current picture and the delta POC values between the POC values of the reference pictures included in the short term reference picture set of the current picture and the POC value of the current picture, when the current index of the short term reference picture set of the current picture is equal to the number of the short term reference picture sets in the part of the bitstream about the sequence parameter set, and
generate the bitstream including the information regarding the number of short term reference picture sets in the part of the bitstream about the sequence parameter set, the delta index information, the information about the sign of the delta RPS and the information about the absolute value of the delta RPS, wherein the current index of the short term reference picture set of the current picture being equal to the number of short term reference picture sets indicates the short term reference picture set regarding the current index is not defined in the sequence parameter set and is defined in a slice header.

3. A non-transitory computer-readable storage medium storing a bitstream comprising:

information regarding a number of short term reference picture sets included in a part of the bitstream about a sequence parameter set; and delta index information about a difference between a current index of a short term reference picture set of a current picture and an index of a reference short term reference picture set, information about a sign of a delta RPS and information about an absolute value of the delta RPS, wherein the delta index information, the information about the sign of the delta RPS and the information about the absolute value of the delta RPS are generated and are included in the bitstream to determine the index of the reference short term reference picture set, determine the delta RPS, and determine delta picture order count (POC) values between POC values of reference pictures included in the short term reference picture set of the current picture and a POC value of the current picture by adding each delta POC value between the POC value of reference picture in the reference short term reference picture set and the POC value of the current picture to the delta RPS, and determine the POC values of the reference pictures included in the short term reference picture set of the current picture based on the POC value of the current picture and the delta POC values between the POC values of the reference pictures included in the short term reference picture set of the current picture and the POC value of the current picture, when the current index of the short term reference picture set of the current picture is equal to the number of the short term reference picture sets in the part of the bitstream about the sequence parameter set;

wherein the current index of the short term reference picture set of the current picture being equal to the number of short term reference picture sets indicates the short term reference picture set regarding the current index is not defined in the sequence parameter set and is defined in a slice header; and wherein the index of the reference short term reference picture set is smaller than the current index of the short term reference picture set.

* * * * *